UNITED STATES PATENT OFFICE.

TALMADGE BLASS, OF LACKAWANNA, NEW YORK, ASSIGNOR OF ONE-HALF TO WILLIAM H. ABBOTT, OF HAMBURG, NEW YORK.

METHOD OF MAKING PAINT.

1,401,034.        Specification of Letters Patent.     Patented Dec. 20, 1921.

No Drawing.     Application filed February 9, 1920. Serial No. 357,341.

*To all whom it may concern:*

Be it known that I, TALMADGE BLASS, a citizen of the United States of America, and a resident of the city of Lackawanna, county of Erie, and State of New York, have invented a certain new and useful Method of Making Paint, of which the following is a full, clear, and exact description.

This invention relates generally to a method of making waterproof and pigment carrying paint from a coal tar oil.

More particularly the invention relates to a method of making a waterproof and pigment carrying paint from that part of the coal tar oil which is known in the trade as a crude, heavy, solvent naphtha which is suitably treated in the manner hereinafter described with a mineral acid.

As is well known, this crude, heavy, solvent naphtha, distils at a temperature of 160° C. to 210° C. and carries cumarone ($C_8H_6O$). This fraction of coal tar oil carries several different oils, and cumarone is one of these oils. When this fraction is subjected to temperatures of from 160° C. to 175° C., cumarone is separated. This fraction is very volatile and, without further treatment, is not suitable for a paint oil, as it evaporates, leaving nothing to carry or hold the pigments. When, however, it is treated with a suitable quantity of a mineral acid, such as sulfuric acid, the cumarone fraction thereof is polymerized into the resinous body, known as paracumarone. As is well known, paracumarone is an amber colored resin which, when separated, is hard and impervious to water. When acid is added to the coal tar fraction, it dehydrates the oil, owing to its affinity for water, and thus removes all moisture from the oil. It is for this reason that I can use Portland cement as the pigment, either in combination with other pigments or alone as desired.

In carrying out my invention, I do not attempt to separate the paracumarone formed by the mixture of the acid with the cumarone, but leave it in solution with the remainder of the oils that make up the crude, solvent naphtha so as to give body and waterproof qualities to the oil and to the paint which is made by means of the method herein described.

Therefore, I treat this coal tar fraction with a sufficient quantity of a mineral acid, such as sulfuric acid to only sufficiently polymerize the oil so as to give it the required viscosity to make it spread properly when applied with a brush. Of course, the amount of acid used depends upon the amount of viscosity required or desired. For ordinary purposes, I have found that a proper consistency will be given to the oil if about .75% in volume of a mineral acid such as, for example, sulfuric acid ($H_2SO_4$) be mixed with 99.25% of the crude, solvent naphtha.

After the crude, solvent naphtha is treated with the sulfuric acid, it is then mixed with a sufficient quantity of anhydrous alkali, (such as unslaked lime, calcium oxid) to neutralize any acid that the mixture may carry. Then, after the neutralized acid has settled, the oil is drawn off and is then ready to be mixed with suitable pigments.

When producing my paint for covering wood, any desired pigment may be used. When, however, it is desired to have a paint for protecting metal, such as iron, I preferably use a small amount of Portland cement which is mixed with some suitable pigment to give the desired color. When so mixed, this Portland cement will retain its chemical and physical qualities after being applied with the brush to the metal as long as it remains dry. When, however, it is subjected to moisture, it will hydrate and harden, thus making a very desirable protection for the material so covered.

This crude, heavy, solvent naphtha, when treated as herein described, makes a good carrier for the cement and colored pigments and, moreover, it is waterproof.

Having thus described my invention, what I claim is:

1. The method of making a waterproof paint comprising the treatment of a crude, solvent naphtha with a sufficient quantity of sulfuric acid to make it of the desired viscosity to spread properly when applied with a brush.

2. The method of making a waterproof paint comprising the treatment of a crude, solvent naphtha with a sufficient quantity of sulfuric acid to make it of the desired viscosity to spread properly when applied with a brush, and then treating the mixture with a sufficient quantity of anhydrous alkali to neutralize the acid in the mixture.

3. The method of making a waterproof paint comprising the treatment of a crude, solvent naphtha with a sufficient quantity of sulfuric acid to make it of the desired viscosity to spread properly when applied with a brush, then adding a suitable pigment to produce the desired color, and then treating the mixture with a sufficient quantity of anhydrous alkali to neutralize the acid in the mixture.

4. The method of making a waterproof paint comprising the partial polymerization of the cumarone fraction of a coal tar oil by means of sulfuric acid, and then treating the mixture with a sufficient quantity of an anhydrous alkaline material to neutralize the acid in the mixture.

5. The method of making a waterproof paint comprising the partial polymerization of the cumarone fraction of a coal tar oil by means of sulfuric acid, then neutralizing the acid in the mixture with an anhydrous alkaline material, and then adding a suitable pigment to produce the desired color.

6. The method of making a waterproof paint comprising the partial polymerization of the cumarone fraction of a coal tar oil by means of sulfuric acid, then adding a sufficient quantity of an anhydrous alkaline material to neutralize the acid in the mixture, then allowing the mixture to settle and drawing off the oil, and then adding a suitable pigment to produce the desired color.

7. The method of making a waterproof paint comprising the partial polymerization of the cumarone fraction of a coal tar oil with sulfuric acid, then treating the mixture with a sufficient quantity of an anhydrous alkaline material to neutralize the acid in the mixture, and then adding a suitable quantity of Portland cement.

In testimony whereof, I have hereunto signed my name.

TALMADGE BLASS.